March 10, 1931.    H. R. CARVETH    1,796,241
PROCESS OF PRODUCING SODIUM PEROXIDE
Filed Jan. 29, 1926
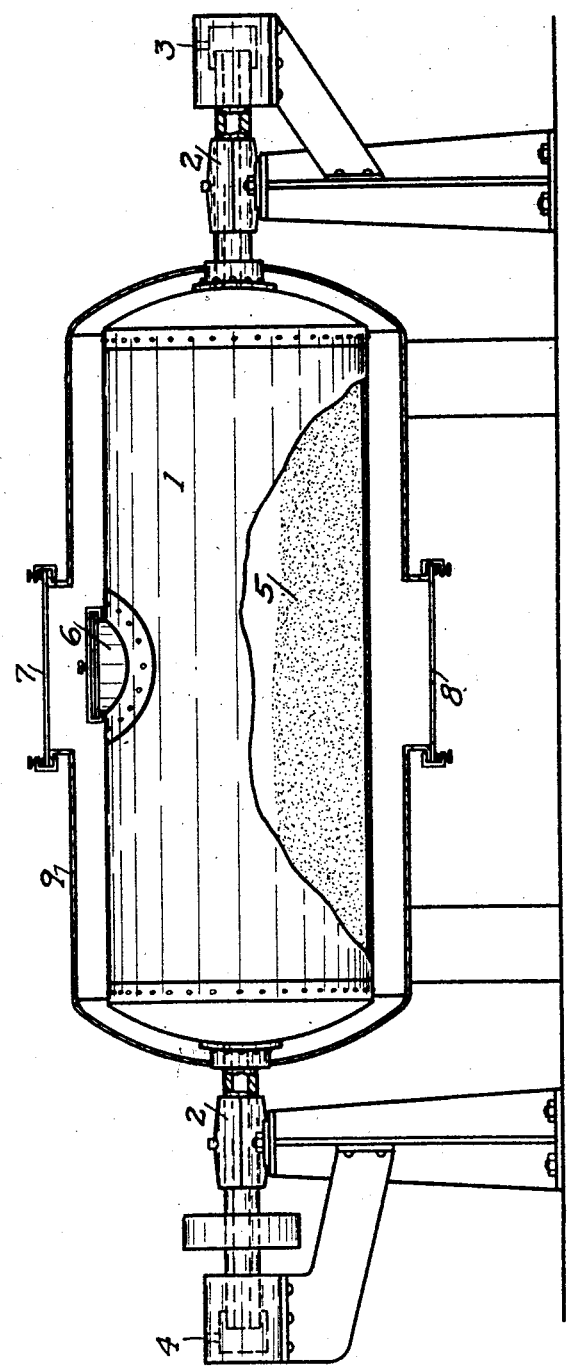
INVENTOR
HECTOR R. CARVETH
by his attorney Patented Mar. 10, 1931

1,796,241

UNITED STATES PATENT OFFICE

HECTOR RUSSELL CARVETH, OF NIAGARA FALLS, NEW YORK, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS OF PRODUCING SODIUM PEROXIDE

Application filed January 29, 1926. Serial No. 84,544.

This process pertains to the production of sodium oxide, particularly sodium peroxide.

The object of the invention is to produce sodium peroxide of high test and exceptional purity. Another object is to reduce the labor and equipment costs of the process that enter into the production of sodium peroxide.

Briefly, my process consists in oxidizing sodium to sodium monoxide in an atmosphere containing less oxygen than is found in the air, and in oxidizing the monoxide to peroxide in an atmosphere containing more oxygen than is found in the air.

Sodium peroxide is usually made by oxidizing a product consisting of substantially sodium monoxide with small but varying amounts of sodium and sodium peroxide. Dry air free from carbon dioxide is usually employed and if proper conditions are maintained a fairly good product may be manufactured. The reaction is exothermic but unless a temperature of between 200 and 350° C. is maintained oxidation proceeds too slowly for commercial use. Since the heat of reaction will not maintain a desirable temperature, the reaction vessels must be heated in some way.

Sodium peroxide is very reactive chemically and hence tends to corrode whatever containing vessels are used, such corrosion increasing with the temperature. It is a serious source of contamination of the final product. Oxidation proceeds more rapidly at high than at low temperatures; it proceeds more rapidly in thin layers than in thick when resting quietly on pans or shelves; it proceeds more rapidly with stirring than without. One of the important problems in the manufacture of high grade sodium peroxide was therefore to get rapid and complete oxidation with a minimum of corrosion.

An important improvement in the art was made when I discovered that sodium monoxide could be mixed with as much as 10% of finely divided metallic sodium to give a pulverulent mixture. This mixture and the process of producing sodium monoxide therefrom is disclosed and claimed in my copending application filed of even date herewith and issued as U. S. P. 1,685,520. This product can be oxidized to peroxide in pans with or without agitation, but I found the limitations as indicated above always made necessary a compromise between conditions giving rapid complete oxidation and conditions causing excessive corrosion and contamination of the mass.

I have now discovered that monoxide can be oxidized more rapidly by using air that has been enriched with oxygen or even by using pure oxygen. The somewhat surprising result is obtained that a variation of oxygen concentration has a more important practical result than a variation of the amount of stirring or a variation of temperature. An increase of oxygen concentration materially decreases the time of reaction and in like manner decreases the amount of corrosion which determines the amount of contamination in the final product. Furthermore, a sodium peroxide of higher test can be made with enriched air than with air containing only the usual amount of oxygen. By using enriched air for converting sodium monoxide to sodium peroxide I have therefore accomplished five new results in the manufacture of sodium peroxide.

1. Peroxide is made of higher test than ever before.

2. This peroxide is of higher purity than has been possible before due to a decreased corrosion of containing vessels.

3. The capacity of equipment has been materially increased because there has been a decreased time factor for complete oxidation of monoxide.

4. There has been a marked decrease in the cost of equipment for any given output.

5. There has been a corresponding decrease in labor costs and supervision.

I will now give one illustration of how my process may be utilized for the production of high grade commercial sodium peroxide. The accompanying drawing illustrates one form of equipment that may be used for the purpose.

1 is a revolving retort made of iron supported at the ends by bearings 2 and revolved by any suitable means. Any desired gas or mixture of gases is introduced through 3 and escaping gases pass through 4. A body of pulverulent sodium monoxide is held in the apparatus. Sodium may be introduced intermittently through 6 and when product is removed 6 serves as an outlet opening when on the under side. 9 is a metal housing completely enclosing the retort 1. Means not shown are used for heating the enclosure or for cooling it as the process may require. Heating may be done, for example, with gas flames playing directly into the enclosure or by means of hot gases from an outside source. The cover 7 is removed when the retort is being filled through 6 and the opening 8 is used when material is being discharged through 6 in its lower position. Cooling may be effected when desired by passing a blast of cold air through the enclosure 9 around the retort 1. When starting my process I fill the retort 1 from one-third to a half full with finely divided sodium monoxide. This is heated to above the melting point of sodium. Sodium is introduced so as to constitute not more than 10% of the resulting mixture of solid monoxide and liquid sodium. The retort is then revolved. Thorough mixing results and when air or any mixture of oxygen and nitrogen is introduced through 3 oxidation begins immediately. If the process is continued all of the sodium distributed throughout the mass 5 is converted to sodium monoxide. During this stage of the reaction enough cold air should be passed through the shell 9 so as to maintain a temperature in the retort of not over 250° C. The preferable temperature is below 200° C. When this reaction is finished the sodium monoxide may be oxidized to sodium peroxide in the equipment where it is made or in another similar piece of equipment. There is always enough sodium monoxide reserved for a repetition of the operation just described. When the monoxide is being converted to peroxide the temperature in the retort is raised to between 200 and 350° C. Pure oxygen or air enriched with oxygen is then passed through the retort. The oxidation continues and may be brought to completion in a much shorter period of time than was heretofore possible when air was used as a source of oxygen.

My process consists of novel means for producing a suitable form of sodium monoxide and a novel means of treating such monoxide for the production of an exceptionally high grade of sodium peroxide. Therefore, I am not limited to any particular form of equipment or to any particular sequence of operations. It will be apparent that a gravity flow from the equipment for making monoxide into equipment for oxidizing said monoxide to peroxide will reduce the labor of handling material and also the possible contact of the material at any stage with the atmosphere. The latter consideration is important because these sodium compounds take up moisture from the air with exceptional speed, and also carbon dioxide. A high grade sodium peroxide cannot be made if there is enough contact with the air to permit of reaction with appreciable amounts of moisture.

My invention also applies to the process of oxidizing sodium monoxide to peroxide without agitation. A good product can be made by placing the monoxide in thin layers on pans or shelves at temperatures below 350° C. and subjecting the same to high concentrations of oxygen in nitrogen.

If the process is operated as I have indicated, iron may be used throughout as the material of construction without seriously contaminating the product with iron impurities.

What I claim is:

1. The process of producing sodium peroxide comprising treating with oxygen a pulverulent mixture of sodium monoxide and not over 10% of finely divided metallic sodium at a temperature between 200–350° C.

2. The process of producing sodium peroxide comprising agitating a pulverulent mixture of sodium monoxide and not over 10% of finely divided metallic sodium at a temperature between 200–350° C. and reacting with air that has been enriched with oxygen.

3. The process of producing sodium peroxide comprising agitating a pulverulent mixture of sodium monoxide and not over 10% of finely divided metallic sodium at a temperature between 200–350° C. and reacting with oxygen.

4. The process of producing sodium peroxide consisting in mixing metallic sodium and finely divided sodium monoxide in proportions that do not produce a pasty mass, agitating and causing oxygen to react with the metallic sodium, thereafter raising the temperature and reacting the sodium monoxide with oxygen.

5. The process of producing sodium peroxide consisting in mixing metallic sodium and finely divided sodium monoxide in such proportions as to produce a mixture containing not over 10% uncombined metallic sodium, agitating and causing oxygen to react with the metallic sodium, thereafter raising the temperature and reacting the sodium monoxide with oxygen.

6. The process of producing sodium peroxide which consists in absorbing molten sodium in an excess of pulverized sodium monoxide at a reacting temperature and supplying oxygen, thereafter raising the temperature so as to react the sodium monoxide with oxygen.

7. The process of producing sodium peroxide which consists in absorbing molten sodium in an excess of pulverized sodium monoxide at a reacting temperature and supplying oxygen at such a rate as to maintain a substantially constant reacting temperature below the vaporization point of sodium, thereafter raising the temperature so as to react the sodium monoxide with oxygen.

8. The process of producing sodium peroxide consisting in mixing sodium and finely divided sodium monoxide in proportions that do not produce a pasty mass, holding the mixture at a temperature between the melting point of sodium and 250° C., agitating and reacting with a mixture of nitrogen and oxygen until all the sodium is converted to monoxide; thereafter raising the temperature of the mass to between 200° and 350° C. and reacting with air that has been enriched with oxygen.

9. The process of producing sodium peroxide consisting in mixing sodium and finely divided sodium monoxide in proportions that do not produce a pasty mass, holding the temperature between the melting point of sodium and 250° C., agitating and treating with a mixture of nitrogen and oxygen; thereafter holding the mass at a temperature between 200° and 350° C., agitating and reacting with air that has been enriched with oxygen.

10. The process of producing sodium peroxide consisting in mixing sodium and finely divided sodium monoxide in proportions that do not produce a pasty mass, holding the temperature between the melting point of sodium and 250° C., agitating and reacting with a mixture of nitrogen and oxygen; thereafter holding the mass at a temperature between 200° and 350° C., agitating and reacting with oxygen.

Signed at Perth Amboy, New Jersey, in the county of Middlesex and State of New Jersey, this 27th day of January, A. D. 1926.

HECTOR RUSSELL CARVETH.